(12) United States Patent
Hanumanthaiah

(10) Patent No.: US 10,344,498 B1
(45) Date of Patent: Jul. 9, 2019

(54) SUN GUARD FOR DASHBOARD-MOUNTED MOBILE DEVICES

(71) Applicant: Suhas Hanumanthaiah, Downey, CA (US)

(72) Inventor: Suhas Hanumanthaiah, Downey, CA (US)

( * ) Notice: Subject to any disclaimer, the term of this patent is extended or adjusted under 35 U.S.C. 154(b) by 0 days.

(21) Appl. No.: 15/859,337

(22) Filed: Dec. 30, 2017

(51) Int. Cl.
| | | |
|---|---|---|
| *E04H 15/36* | (2006.01) |
| *B60J 1/20* | (2006.01) |
| *B60R 13/08* | (2006.01) |
| *B60R 11/02* | (2006.01) |
| *E04H 15/40* | (2006.01) |
| *B60R 11/00* | (2006.01) |

(52) U.S. Cl.
CPC ............ *E04H 15/36* (2013.01); *B60J 1/2011* (2013.01); *B60R 11/0241* (2013.01); *B60R 13/0869* (2013.01); *E04H 15/40* (2013.01); *B60R 2011/0005* (2013.01); *B60R 2011/0056* (2013.01); *B60R 2011/0057* (2013.01); *B60R 2011/0063* (2013.01)

(58) Field of Classification Search
CPC ................................ E04H 15/40; E04H 15/36
USPC .......................................................... 135/125
See application file for complete search history.

(56) References Cited

U.S. PATENT DOCUMENTS

| | | | | |
|---|---|---|---|---|
| 4,075,723 A * | 2/1978 | Bareis | ..................... | B63B 17/02 114/361 |
| 4,941,422 A * | 7/1990 | Muller | ..................... | B63B 17/02 114/201 R |
| 5,593,239 A * | 1/1997 | Sallee | ................... | E04H 12/182 135/114 |
| 5,690,133 A * | 11/1997 | Capwell | .................. | B63B 17/02 135/124 |
| 5,823,217 A * | 10/1998 | Rice | ...................... | E04H 15/003 135/124 |
| 6,062,243 A * | 5/2000 | Tuch | ...................... | B63B 17/02 135/123 |
| 6,209,150 B1 * | 4/2001 | Hsu | ....................... | E04H 4/0025 4/499 |
| 6,749,474 B2 * | 6/2004 | Hsu | ...................... | A47C 15/006 441/131 |
| 6,811,204 B2 * | 11/2004 | Long | ....................... | E04H 15/40 135/88.05 |
| 6,942,005 B2 * | 9/2005 | Le Gette | ................. | E04H 15/40 160/368.1 |

(Continued)

OTHER PUBLICATIONS https://www.amazon.com/Universal-navigator-Sunshade-Shade-Sunshield/dp/B012VQA4OC (Year: 2019).*

*Primary Examiner* — Noah Chandler Hawk
(74) *Attorney, Agent, or Firm* — The Iwashko Law Firm, PLLC; Lev Ivan Gabriel Iwashko

(57) ABSTRACT

A sun guard to protect a mobile device mounted attached to a mobile phone mounting device attached to a surface, the sun guard including a tubing to form a perimeter of a particular structural shape having a front portion, a rear portion, a top portion, a bottom portion, and side portions, such that the mobile device is disposed within the particular structural shape of the tubing, a protective covering to cover the rear portion, the top portion, and the side portions of the particular structural shape, such that the mobile device is shielded from the sun, and a rubber coating to coat bottom edges of the tubing to prevent the sun guard from slipping off the surface.

5 Claims, 4 Drawing Sheets

(56) References Cited

U.S. PATENT DOCUMENTS

| | | | | |
|---|---|---|---|---|
| 7,225,822 B1* | 6/2007 | Zheng | ................... | E04H 15/40 |
| | | | | 135/117 |
| 7,673,642 B1* | 3/2010 | Shires | ................... | E04H 15/36 |
| | | | | 135/119 |
| 8,087,423 B2* | 1/2012 | Knipschild | ............ | E04H 15/40 |
| | | | | 135/116 |
| 8,453,664 B2* | 6/2013 | Parsons | ................ | E04H 15/425 |
| | | | | 135/127 |
| 8,899,253 B1* | 12/2014 | Watson | ................... | E04H 15/40 |
| | | | | 135/125 |
| 9,103,137 B2* | 8/2015 | Williams | ................ | E04H 15/18 |
| 9,644,390 B1* | 5/2017 | Garvens | ................ | E04H 15/02 |
| 2007/0079859 A1* | 4/2007 | Yang | ................... | E04H 15/003 |
| | | | | 135/137 |
| 2012/0240970 A1* | 9/2012 | Parsons | ................ | E04H 15/425 |
| | | | | 135/126 |

* cited by examiner

SUN GUARD FOR DASHBOARD-MOUNTED MOBILE DEVICES

BACKGROUND OF THE INVENTION

1. Field of the Invention

The present general inventive concept relates generally to a sun guard, and specifically, to a sun guard usable with dashboard-mounted mobile devices.

2. Description of the Related Art

In a world where reliance on electronics has steadily grown, the conventional phone/GPS mount is a useful inventions designed for mounting a phone and/or a GPS in vehicles in recent years. However, harsh and hot sunlight shining on electronic communication/navigation devices for extended periods of time can overheat them, potentially causing long-term damage and reducing their lifespan.

Therefore, there is a need for a sub guard for dashboard-mounted mobile devices.

SUMMARY

The present general inventive concept provides sun guard for dashboard-mounted mobile devices.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a sun guard to protect a mobile device mounted attached to a mobile phone mounting device attached to a surface, the sun guard including a tubing to form a perimeter of a particular structural shape having a front portion, a rear portion, a top portion, a bottom portion, and side portions, such that the mobile device is disposed within the particular structural shape of the tubing, a protective covering to cover the rear portion, the top portion, and the side portions of the particular structural shape, such that the mobile device is shielded from the sun, and a rubber coating to coat bottom edges of the tubing to prevent the sun guard from slipping off the surface.

The tubing may be flexible to allow a user to create a new shape with the tubing, such that another mobile device having a larger size may be accommodated within the sun guard.

The protective covering may be flexible to allow the user to create the new shape.

A display unit of the mobile device may be visible when the mobile device is disposed within the sun guard.

The mobile device may be removed from the sun guard by a user lifting the sun guard such that the mobile device passes through the bottom portion that is not covered by the protective covering.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION OF THE INVENTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Figure 1:
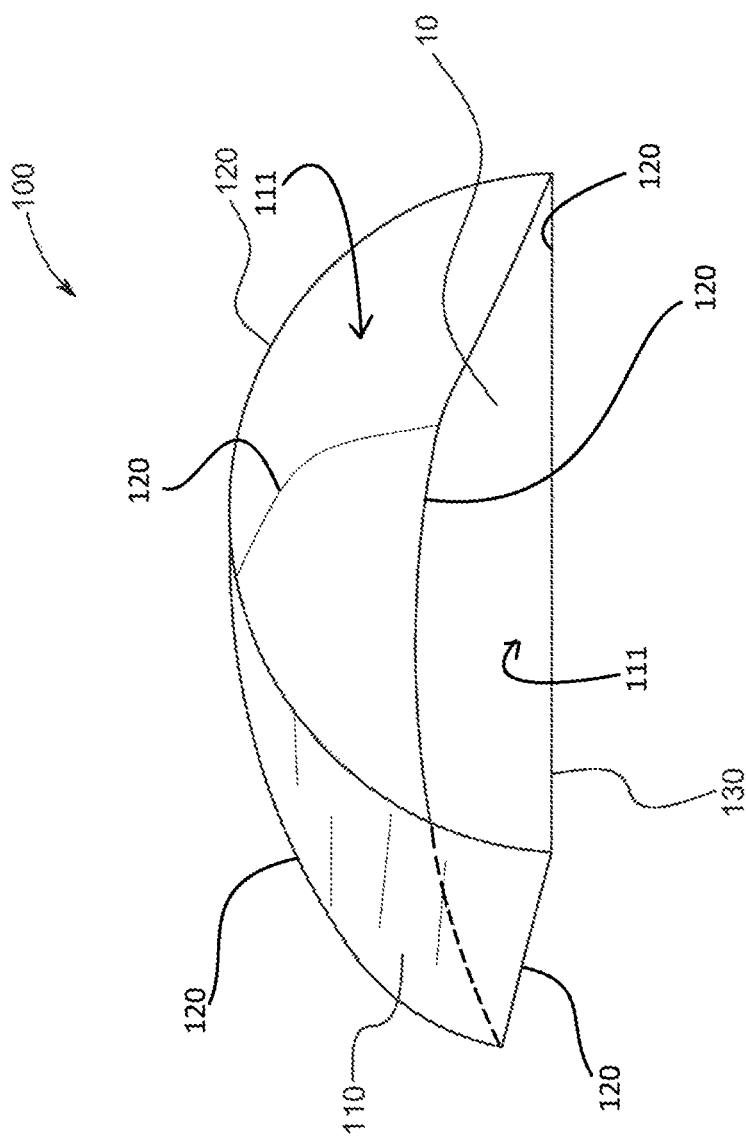
FIG. 1 illustrates a sun guard, according to an exemplary embodiment of the present general inventive concept.

FIG. 1 illustrates a sun guard 100, according to an exemplary embodiment of the present general inventive concept.

The sun guard 100, and components thereof, may be made from metal, plastic, rubber, cloth, wood, or any other material known to one of ordinary skill in the art.

The sun guard 100 may include a protective covering 110, a tubing 120, and a rubber coating 130.

The protective covering 110 may include a plurality of openings 111, but is not limited thereto.

The protective covering 110 may be disposed on a top portion of the sun guard 100 to provide shelter from the sun for an object disposed within the sun guard 100.

Although the protective covering 110 may cover a top portion, a rear portion, and side portions of the sun guard 100, a bottom portion of the sun guard 100 may remain uncovered to allow the sun guard 100 to be placed overtop a device such that the device is inside the sun guard 100. Also, a front portion of the sun guard 100 may be uncovered to allow a user to view a front portion of the device when the device is inside the sun guard 100. In other words, each of the plurality of openings 111 of the protective covering 110 may allow the user to place the sun guard 100 overtop the device and/or may allow the user to view the front portion of the device.

The protective covering 110 may be made from a flexible, deformable, and/or malleable material, such that it may be manipulated into various shapes.

The tubing 120 may form a particular and/or predetermined shape of the sun guard 100, may be disposed along an entire perimeter of the sun guard 100 to provide structural stability for the sun guard 100, and may be flexible to deform in order to accommodate objects of various sizes disposed within the sun guard 100.

In other words, the tubing 120 may form a particular structural shape having a front portion, a rear portion, a top portion, a bottom portion, and side portions.

The rubber coating 130 may be disposed on bottom portions and/or edges of the tubing 120, in order to prevent the sun guard from moving or slipping off of a surface 10.

Figure 2:
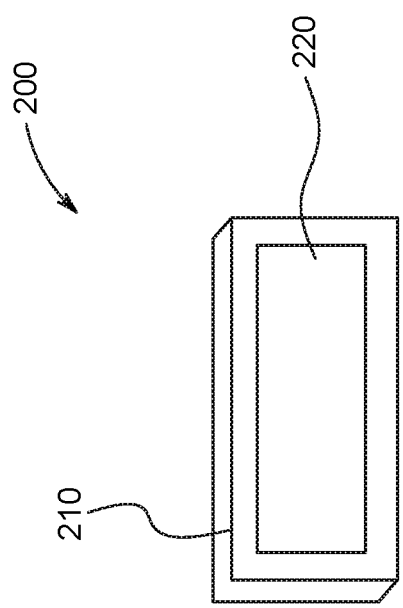
FIG. 2 illustrates a conventional mobile device.

FIG. 2 illustrates a conventional mobile device 200.

The conventional mobile device may include a body 210 and a display portion 220.

The conventional mobile device 200 may be a mobile telephone, a global positioning system (GPS), or any other conventional mobile device known to one of ordinary skill in the art, and therefore, may also have all necessary components included therewith.

Figure 3:
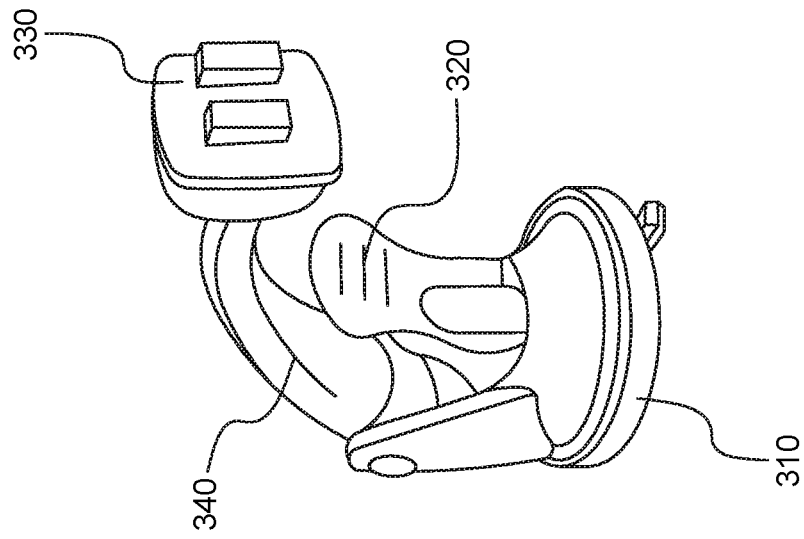
FIG. 3 illustrates a conventional dashboard mounting apparatus.

FIG. 3 illustrates a conventional dashboard mounting apparatus 300.

The conventional dashboard mounting apparatus 300 may include a dashboard mounting portion 310, a fixing unit 320, a mobile device mounting portion 330, and an adjusting portion 340.

Referring to FIGS. 1 and 3, the dashboard mounting portion 310 may include a suction-cup device, magnets, or an adhesive to allow for mounting onto the surface 10, and the fixing unit 320 may be manipulated to secure the dashboard mounting portion 310 onto the surface 10.

Referring to FIGS. 2 and 3, the mobile device mounting portion 330 may adhere to a rear portion of the conventional mobile device 200 using a suction-cup device, magnets, an adhesive, or any other type of mounting method known to one of ordinary skill in the art.

When the conventional mobile device 200 is mounted onto the mobile device mounting portion 330, the adjusting portion 340 may be manipulated to move the conventional mobile device 200 to a position desired by the user.

Figure 4:
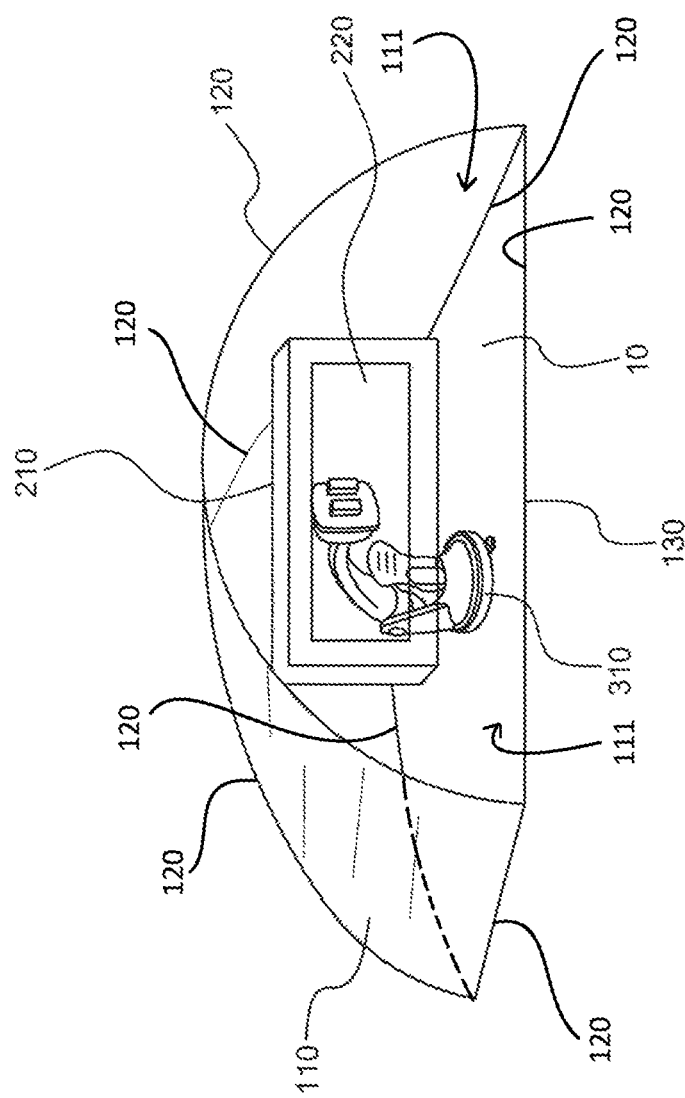
FIG. 4 illustrates the sun guard used in conjunction with the conventional mobile device mounted on the conventional dashboard mounting apparatus, according to an exemplary embodiment of the present general inventive concept.

FIG. 4 illustrates the sun guard 100 used in conjunction with the conventional mobile device 200 mounted on the conventional dashboard mounting apparatus 300, according to an exemplary embodiment of the present general inventive concept.

Referring to FIG. 1 through 4, it is clear that: (1) the conventional mobile device 200 is mounted onto the mobile device mounting portion 330 of the conventional dashboard mounting apparatus 300; (2) the dashboard mounting portion 310 of the conventional dashboard mounting apparatus 300 is fixed to the surface 1; and (3) the sun guard 100 is placed on the surface 10 to cover and house both the conventional mobile device 200 and the conventional dashboard mounting apparatus 300 to which the conventional mobile device 200 is mounted, thereby shielding the conventional mobile device 200 from the sun.

Furthermore, FIG. 4 clearly illustrates that the display unit 220 of the conventional mobile device 200 is visible to the user through at least one of the plurality of openings 111, even when the conventional mobile device 200 is disposed within the sun guard 100.

Moreover, in order to remove the conventional mobile device 200 from the sun guard 100, the a user may simply lift the sun guard 100 such that the conventional mobile device 200 remains stationary, but passes through at least one of the plurality of openings 111 at the bottom portion of the sun guard 100 that is not covered by the protective covering 110.

Although a particular shape of the sun guard 100 has been illustrated in FIGS. 1 and 4, other shapes may be utilized, such as cubes, prisms, etc., but are not limited thereto. Also, other surface-mounting mechanisms for the sun guard 100 may be utilized, such as suction cups, magnets, and adhesives, which are disposed on or near the bottom portion and/or edge of the tubing 120.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A sun guard to protect a mobile device attached to a mobile phone mounting device attached to a surface, the sun guard comprising:
    a flexible tubing forming the perimeter of a substantially semi-cylindrical structural shape, the shape having a semi-circular front portion, a semi-circular rear portion, a top portion, a rectangular bottom portion, and side portions, such that the mobile device is disposed within the structural shape of the tubing, and such that the tubing at the bottom portion surrounds the mobile device;
    wherein the flexible tubing comprises four flexible members forming the rectangular bottom portion and two flexible arcuate members extending therefrom to form the semi-cylindrical shape;
    a flexible protective covering to cover the rear portion, the top portion, and the side portions of the structural shape, such that the mobile device is shielded from the sun;
    a rubber coating to coat bottom edges of the rectangular bottom portion of the tubing to prevent the sun guard from slipping off the surface;
    wherein the sun guard is sized and configured for placement on a dashboard of a vehicle.

2. The sun guard of claim 1, wherein flexible tubing allows a user to create a new shape with the tubing, such that another mobile device having a larger size may be accommodated within the sun guard.

3. The sun guard of claim 2, wherein the flexible protective covering allows the user to create the new shape.

4. The sun guard of claim 1, wherein a display unit of the mobile device is visible when the mobile device is disposed within the sun guard.

5. The sun guard of claim 1, wherein the mobile device is removed from the sun guard by a user lifting the sun guard such that the mobile device passes through the bottom portion that is not covered by the protective covering.

* * * * *